(12) United States Patent
Vilcovsky (10) Patent No.: US 7,948,481 B2
(45) Date of Patent: May 24, 2011

(54) DEVICES, SYSTEMS AND METHODS OF CAPTURING AND DISPLAYING APPEARANCES

(76) Inventor: Nissi Vilcovsky, Tel Aviv (IL)

( * ) Notice: Subject to any disclaimer, the term of this patent is extended or adjusted under 35 U.S.C. 154(b) by 870 days.

(21) Appl. No.: 11/817,411

(22) PCT Filed: Mar. 1, 2006

(86) PCT No.: PCT/IL2006/000281
§ 371 (c)(1),
(2), (4) Date: Aug. 30, 2007

(87) PCT Pub. No.: WO2006/092793
PCT Pub. Date: Sep. 8, 2006

(65) Prior Publication Data
US 2008/0151092 A1 Jun. 26, 2008

Related U.S. Application Data

(60) Provisional application No. 60/656,884, filed on Mar. 1, 2005, provisional application No. 60/656,885, filed on Mar. 1, 2005.

(51) Int. Cl.
*G06F 3/038* (2006.01)
(52) U.S. Cl. .......................... 345/204; 345/212; 345/214

(58) Field of Classification Search .......... 345/204–215; 348/333.01; 434/395
See application file for complete search history.

(56) References Cited

U.S. PATENT DOCUMENTS

| | | | |
|---|---|---|---|
| 2003/0085866 A1 | 5/2003 | Bimber et al. | |
| 2006/0178902 A1* | 8/2006 | Vicars et al. | 705/1 |
| 2009/0091710 A1* | 4/2009 | Huebner | 353/28 |

OTHER PUBLICATIONS

International Search Report for PCT/IL06/00281 mailed on Jun. 12, 2007.

* cited by examiner

*Primary Examiner* — Vijay Shankar
(74) *Attorney, Agent, or Firm* — Shiloh et al.

(57) ABSTRACT

Some demonstrative embodiments of the invention include systems, devices and/or methods enabling appearance comparison. The system, according to some demonstrative embodiments, may include at least one interactive imaging and display station. The station may include, for example, a mirror-display device capable of selectably operating in either or both a mirror mode or a display mode; an imaging device to capture one or more appearances appearing in a filed of view in front of the mirror-display device; and/or an image control unit to select the mode of operation of the mirror-display device according to a user command. Other embodiments are described and claimed.

18 Claims, 4 Drawing Sheets

DEVICES, SYSTEMS AND METHODS OF CAPTURING AND DISPLAYING APPEARANCES

CROSS REFERENCE TO RELATED APPLICATIONS

This application is a National Phase Application of PCT International Application No. PCT/IL06/000281, International Filing Date Mar. 1, 2006, which claims the benefit of U.S. Provisional Application No. 60/656,884, filed Mar. 1, 2005; and U.S. Provisional Application No. 60/656,885, filed Mar. 1, 2005, the entire disclosures of all of which are incorporated herein by reference.

FIELD OF THE INVENTION

The invention relates generally to imaging and display systems and, more particularly, to interactive displays, e.g., in retail and/or service environments.

BACKGROUND OF THE INVENTION

Customers may shop for consumer articles, for example, apparel such as clothes, e.g., shirts, pants, coats and other garments, as well as shoes, glasses, and/or any other items or products, such as cosmetics, furniture and the like. Shopping normally takes place at a shopping facility, for example, retail stores. Prior to making a decision which article to buy a customer may try on various articles (e.g., apparel, cosmetics) and/or pose with other articles (e.g., furniture), and may view for each trial a user-appearance in front of a mirror, which may be located, for example, at a trial area of the retail store. For example, the customer may try on a first article, e.g., a suit, and view for that first trial his/her user-appearance in front of the mirror. Then, the customer may try on a second article, e.g., another suit. The customer may then need to memorize his/her user-appearance from the first trial in order to perform a mental comparison between the first article and the second article, thereby to evaluate which of the two articles might be a better fit for the customer.

Unfortunately, since the customer may try on numerous articles and/or since the second trial may take place a considerable amount of time after the first trial, the customer may not be able to recall his/her appearance for each trial and may therefore be required to repeatedly retry articles, e.g., items of apparels, previously tried on. This may result in a frustrating and inefficient shopping experience.

SUMMARY OF SOME EMBODIMENTS OF THE INVENTION

Some demonstrative embodiments of the invention include devices, systems and/or methods enabling appearance comparison.

According to some demonstrative embodiments of the invention, a system enabling appearance comparison may include at least one interactive imaging and display station. The station may include, for example, a mirror display device capable of operating in either or both a mirror or a display mode; an imaging device to capture one or more appearances from a field of view in front of the mirror-display device; and/or an image control unit to select the mode of operation the mirror display device according to a user command.

According to some demonstrative embodiments of the invention the image control unit may include an input device to receive the user command.

According to some demonstrative embodiments of the invention, the image control unit may include a storage device to store data of one or more images which may correspond to one or more appearances.

According to some demonstrative embodiments of the invention, the mirror-display device may be capable of being partitioned into at least first and second simultaneously-displayable frames. The first frame may be selectably operable, for example, both in a mirror mode and a display mode. The second frame may be operable, for example, in a mirror mode.

According to some demonstrative embodiments of the invention, the imaging device may be capable of capturing three-dimensional images of appearances.

According to some demonstrative embodiments of the invention, the mirror-display device may be capable of displaying images of appearances at predefined sequences.

According to some demonstrative embodiments of the invention, the image control unit may be able to selectively enable a user access to images of appearances authorized to the user, e.g., based on user-identifying data received from the user.

According to some demonstrative embodiments of the invention, the at least one interactive imaging and display system may include two or more interactive imaging and display stations able to communicate over a network. For example, the two or more stations may be able to communicate between each other data representing images of appearances.

According to some demonstrative embodiments of the invention, the image control unit may control the mirror-display device to display, e.g., during the display mode, one or more images corresponding to the appearances. The one or more images may include, for example, one or more mirrored appearances.

According to some demonstrative embodiments of the invention, a method enabling appearance comparison may comprise using a mirror mode of operation of a mirror-display device capable of being selectably operated in either a mirror or a display mode; capturing an image corresponding to an appearance of a first trial in front of the mirror-display device; storing the image of the first trial; selecting the display mode of operation of the mirror-display device; and/or retrieving the image of the first trial and displaying the image on the mirror-display device.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

It will be appreciated that for simplicity and clarity of illustration, elements shown in the figures have not necessarily been drawn accurately or to scale. For example, the dimensions of some of the elements may be exaggerated relative to other elements for clarity or several physical components included in one element. Further, where considered appropriate, reference numerals may be repeated among the figures to indicate corresponding or analogous elements. It will be appreciated that these figures present examples of embodiments of the present invention and are not intended to limit the scope of the invention.

DETAILED DESCRIPTION OF SOME DEMONSTRATIVE EMBODIMENTS OF THE INVENTION

In the following description, various aspects of the present invention will be described. For purposes of explanation, specific configurations and details are set forth in order to provide a thorough understanding of the present invention. However, it will be apparent to one skilled in the art that the present invention may be practiced without the specific details presented herein. Furthermore, some features of the invention relying on principles and implementations known in the art may be omitted or simplified to avoid obscuring the present invention.

Some demonstrative embodiments of the invention may include an interactive system enabling a user to compare one or more appearances, for example, to compare between different appearances, e.g., as described in detail below.

The term "user-appearance" as used herein may relate to the appearance of a customer while trying a consumer article. The article may include, for example, apparel, such as clothing, shoes, glasses, garments, ties, and the like; an article, e.g., furniture, located in the vicinity of the customer; as well as other items, articles, designs or products such as, for example, cosmetics, headdresses, hair cuts.

According to some demonstrative embodiments of the invention, the system may include an imaging device able to capture user-appearances and a mirror-display device, able to operate selectably as a mirror or as a display. When in the mirror mode, the mirror-display device may enable the user to evaluate and/or view a user-appearance of a current trial of a consumer article. When in the display mode, the mirror-display device may enable the user to evaluate and/or view one or more user-appearances, e.g., as captured by the imaging device, of a previous trial, e.g., as described in detail below.

Figure 1:
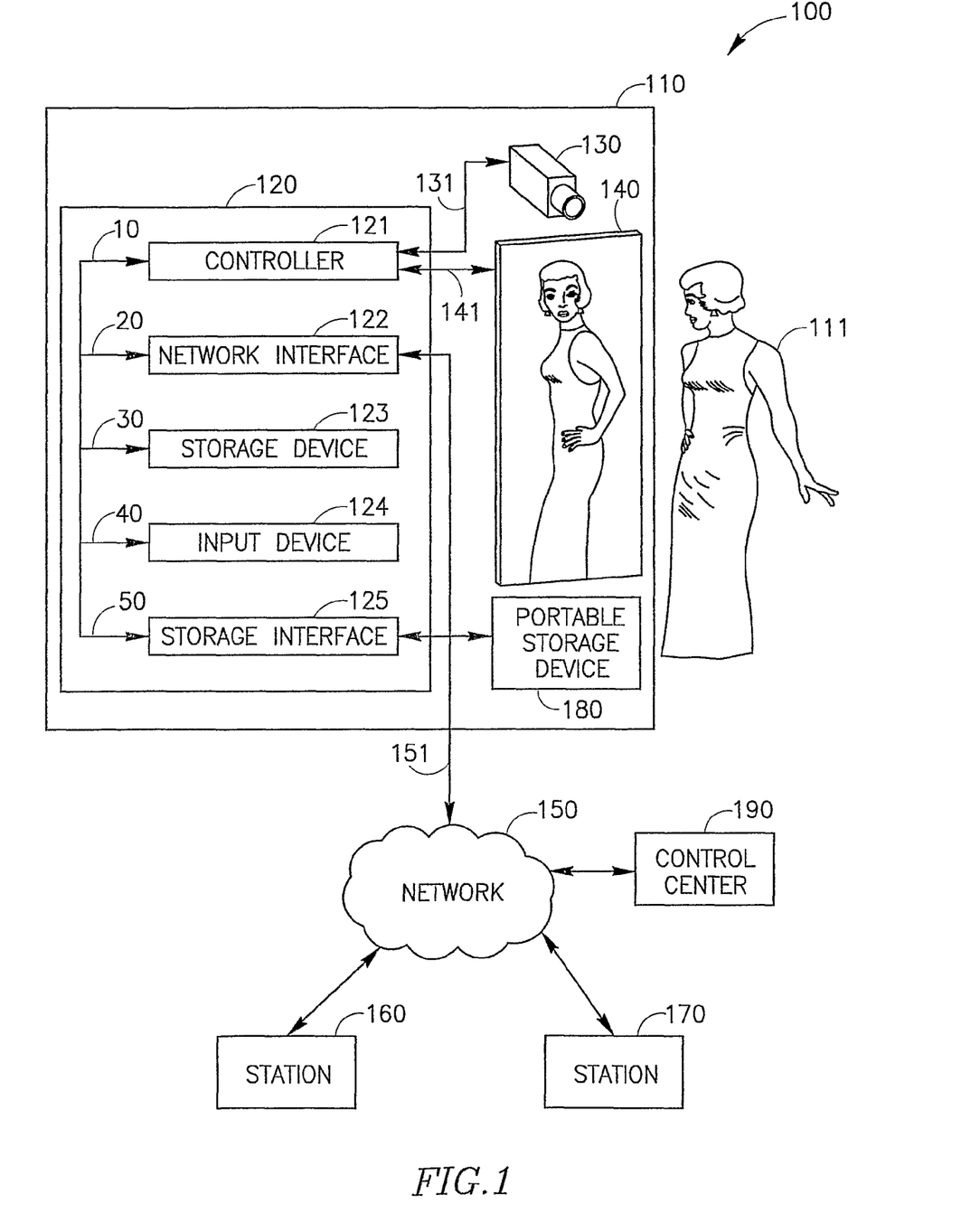
FIG. 1 is a schematic illustration of an interactive system enabling appearance comparison in accordance with some demonstrative embodiments of the invention.

Reference is made to FIG. 1, which schematically illustrates an interactive system 100 in accordance with some demonstrative embodiments of the invention.

According to some demonstrative embodiments of the invention, system 100 may include an interactive imaging and display station 110, which may include an image control unit 120, an imaging device 130, and a mirror-display device 140. Image control unit 120 may include a controller 121, a network interface 122, a storage device 123, an input device 124, all of which elements are described in detail below.

Aspects of the invention are described herein in the context of demonstrative embodiments of an imaging device, e.g., imaging device 130, a mirror-display device, e.g., mirror-display device 140, and/or an image control unit, e.g., image control unit 120, being separate units of an appearance comparison system, e.g., system 100. However, it will be appreciated by those skilled in the art that the invention is not limited in this respect, and that according to other embodiments of the invention, the system may include any suitable configuration, combination, and/or arrangement of the imaging device, the mirror-display device, and/or the image control unit. For example, the system may include an integrated module including the mirror-display device, the imaging device and/or the image control unit. For example, the imaging device and/or the image control unit may be implemented as part of the mirror-display device.

According to some demonstrative embodiments of the invention, mirror-display device 140 may be configured and/or may include components and mechanisms allowing mirror-display device 140 to operate selectably in two modes of operation. In a first mode of operation (the "mirror-mode"), mirror-display device 140 may operate as a mirror. In a second mode of operation (the "display mode"), mirror-display device 140 may operate as a display. When mirror-display device 140 operates in the mirror-mode, a user 111 of system 100 may evaluate and/or view a user-appearance of a first trial of a consumer article, as may be reflected by mirror-display device 140. Imaging device 130 may capture an image of the user-appearance of the first trial. The captured image may be stored, for example, by storage device 123, e.g., as described below. User 111 may then pose in front of mirror-display device 140 trying a second article, and imaging device 130 may capture a second image of the user-appearance of the second trial. When in the display mode, mirror-display 140 may be controlled to display one or more of previously captured images. By virtue of the capability of mirror-display device 140 to operate selectably in the mirror or display mode, user 111 may be able to compare simultaneously or sequentially between the user-appearances of the first and second trials, as described in detail below. In some demonstrative embodiments of the invention, e.g., as shown in FIGS. 1, 2A, 2B, 3A, and/or 3B, controller 121 may control device 140 to display, during the display mode of operation, a mirror-image of the appearances. However, it will be appreciated by those of ordinary skill in the art that the invention is not limited in this respect, and that in other embodiments the controller may control device 140 to display, during the display mode of operation, any other image corresponding to the appearance, e.g., a rotated appearance, a revered appearance, a substantially non-altered, e.g., frontal, appearance, a rendered appearance, and the like, e.g., as described below.

Device 140 may include any suitable configuration and/or mechanism to enable selectably operating mirror-display device 140 in the first and second modes of operation. For example, in one embodiment device 140 may include an array of liquid crystal (LC) elements, which may change their optical attributes such as, e.g., reflectivity, refractive index and the like, depending on, for example, a voltage applied to the liquid crystals. For example, applying a first voltage may result in changing the optical attributes of the liquid crystals such that mirror-display device 140 may operate as a mirror; and a second voltage may result in changing the optical attributes of the liquid crystals such that mirror-display device 140 may operate as a liquid crystal display.

In another embodiment of the invention, for example, mirror-display device 140 may include a liquid crystal display (LCD) device embedded in a semi-reflective or one-directional mirror. Accordingly, if the LCD is switched to an inactive mode of operation, mirror-display 140 may passively reflect sufficient light incident thereon to enable the user to view user-appearances at reasonable quality and brightness. In contrast, when the LCD is turned to an active mode of operation, mirror-display device 140, images displayed by the LCD device may be viewed by user 111 because they may be significantly brighter than residual reflections from the surface of the mirror-display.

According to some demonstrative embodiments of the invention, mirror display device 140 may be implemented by a LCD HD ready mirror TV such as, for example, model No. 32PM8822/10 available from Royal Philips Electronics, e.g., as described at the Internet site <http://www.research.philips.com/newscenter/archive/2003/mirrortv.html>. Such a device may include, for example, a polymer-based organic light-emitting display (OLED). Mirror-display device 140 may include any other suitable device implementing any suitable display technology. For example, device 140 may include a nano-emissive display (NED); a plasma display panel (PDP); a cathode ray tube display (CRT); a Digital Light Processing (DLP) display; a surface conduction electron emitter display (SED); a Tablet screen; a flat-panel SED; an Organic electronic display; electronic paper; a 3-Dimensional display, e.g., a Hologram display; a thin film resistor (TFT) display; an optical TFT; a Dot Matrix LED screen; an LCD having CCD capabilities, e.g., such that mirror-display 140 may be capable of performing the functionality of imaging device 130; a paintable LCD; a surface-conduction electron-emitter (SED) display; a high definition television (HDTV) display; a rear projector display device, and the like.

According to some demonstrative embodiments of the invention, imaging device 130 may be adapted to capture one or more appearances from a Field-of-View (FOV) in front of mirror-display device 140. The FOV in front of mirror-display device 140 may include, for example, a field, area, scene, zone, and/or region in front of mirror-display device 140. For example, the FOV may include at least part of a field, area, scene, zone, and/or region captured by mirror-display device 140 when in the mirror mode.

Although the scope of the present invention is not limited in this respect, imaging device 130 may be or may include, for example, a CCD camera, a video camera, a camera and/or camera set-up enabling capturing of 3D-images, e.g., a stereoscopic camera and the like. A stereoscopic camera may be adapted, for example, to capture a 3-D image of the user-appearance. The stereoscopic camera may include, for example, two lenses having a distance between each other that may correspond to a distance between two human eyes. Accordingly, the stereo camera may be able to simulate human binocular vision, also known as Stereophotography, thereby being able to capture a 3D-image.

According to some demonstrative embodiments of the invention, station 110 may be a stand alone unit, which may be located at an appearance-comparison area of a desired location, for example, an office, a home, or a retail store, e.g., apparel store.

According to other demonstrative embodiments of the invention, station 110 may be connected, e.g., via network interface 122, to a network, for example, a network 150, thereby enabling communication between station 110 and one or more other stations affiliated with network 150 such as, for example, station 160 and/or station 170.

According to some demonstrative embodiments of the invention, station 110 may include a network interface 122, which may be adapted to interact with network 150, to send and receive information from other stations in network 150, as described herein. Such information may include but is not limited to data corresponding to images of users captured at various stations of system 100, for example, station 160 and/or 170, as well as identifying information of the users to enable secure access to the system, as described in more detail below. Network 150 may include, for example, a local area network (LAN), a wide area network (WAN), a global communication network, e.g., the Internet, a wireless communication network such as, for example, a wireless LAN (WLAN) communication network, a Bluetooth network, a wireless virtual private network (VPN), a cellular communication network, for example, a 3$^{rd}$ Generation Partnership Project (3GPP), such as, for example, Frequency Domain Duplexing (FDD) network, a Global System for Mobile communications (GSM) network, a Wideband Code Division Multiple Access (WCDMA) cellular communication network, and the like.

According to some demonstrative embodiments of the invention, one or more of stations 160 and 170 may be portable devices. Non-limiting examples of such portable devices may include a mobile telephone, a laptop computer, a notebook computer, a mobile computer, a Personal Communication Systems (PCS) device Personal Digital Assistants (PDA), a wireless communication device, a PDA device which incorporates a wireless communication device, a cellular telephone, a wireless telephone, a smart card, a token, a memory card, a memory unit, and the like. In some embodiments of the invention, one or more of stations 160 and 170 may be non-portable devices such as, for example, a desktop computer, a tablet computer, a television set, a server computer, and the like.

According to some embodiments of the invention, system 100 may also include a control center 190, which may be connected to stations 110, 160 and/or 170, e.g., via network 150. Control center 190 may receive and store data, which may represent, for example, data and/or images of user-appearances, received from one or more of stations 110, 160 and/or 170.

According to some embodiments of the invention, stations 110, 160 and/or 170 may be located at different locations such as, for example, different stores of a retail chain. In addition, stations 110, 160 and/or 170 may be located at different locations within a building, e.g., different floors, different sections at the same floor and the like. Such locations may include, for example, clothing stores, shoe stores, points of sale, concept showrooms, exhibitions, shopping malls, eyewear stores, cosmetic stores, sport clubs, health institutes, fitness centers, airports, train stations, coffee shops, restaurants, hotels, homes, and the like. One or more of stations 110, 160 and 170 may also be used for interactive billboard signs. For example, imaging device 130 may, for example, capture images which may be displayed on a billboard sign (not shown). System 100 may enable user 111 to choose an image to be displayed on the billboard sign out of a plurality of images of, for example, various previous trials of apparel.

According to some demonstrative embodiments of the invention, images of user appearances may be viewed at different locations. For example, imaging device 130 may capture an image of the first trial. The image may then be sent from network interface 122 via network 150 using signals 151 and 152, for example, to station 160. Accordingly, user 111 may be able to view the image of the first user-appearance at station 160. Therefore, user 111 may be able to view, for example, the user-appearance of the first trial in a first store of a retail store chain, e.g., a store associated with station 110; and may compare the user-appearance of the first trial with a user-appearance of a second trial, which may take place at a second store of the same or an affiliated chain, e.g., a store associated with station 160; and/or at a different time, e.g., one or more hours, days or weeks after the first trial.

According to another demonstrative embodiment of the invention, imaging device 130 may capture an image of a user-appearance of a first trial, and send the image via network interface 122 over network 150 to control center 190, where the image may be stored for later retrieval. Accordingly, user 111 may gain access to the images of the first trial by accessing any station, e.g., station 160, connected over network 150 with control center 190.

According to some demonstrative embodiments of the invention, storage device 123 may include, for example, a hard disk drive, a floppy disk drive, a Compact Disk (CD) drive, a CD-ROM drive, a Digital Versatile Disc (DVD) drive, or other suitable removable or non-removable storage units.

According to some demonstrative embodiments of the invention, controller 121 may be or may include, for example, a Central Processing Unit (CPU), a Digital Signal Processor (DSP), a microprocessor, a controller, a chip, a microchip, an Integrated Circuit (IC), or any other suitable multi-purpose or specific processor or controller, e.g., as are known in the art.

Input device 124 may include, for example, a keyboard; a remote control; a motion sensor; a pointer device such as, for example, a laser pointer; a mouse; a touch-pad; a touch screen, which may be embedded, for example, in mirror-display device 140, or may be implemented by any other suitable unit, e.g., separate from device 140; a biometric input device, e.g., a fingerprint scanner, and/or a camera for scanning a face; and/or any other suitable pointing device or input device. Input device 124 may be adapted to receive user-identifying data, for example, to enable, access, e.g., secure access, of user 111 to system 100, as described in detail below.

According to some demonstrative embodiments of the invention, user 111 may provide user commands to input device 124 for operating the imaging device 130. Input device 124 may include, for example, an interface to enable user 111 of system 100 to define operational parameters of imaging device 130. Controller 121 may receive the inputs from user 111 via signals 131 and control the operation of imaging device 130 accordingly. The user commands may include, for example, commands relating to the timing for capturing an image, the positioning of imaging device 130, e.g., according to an automatic tracking algorithm which may follow, for example, the position of user 111, and/or imaging attributes such as focus, camera position, capturing angle, dynamic range and the like. The user commands may also include commands to define image capturing operating modes of imaging device 130 such as, for example, a video capturing mode, a photographic mode and the like. According to some embodiments of the invention, imaging device 130 may include a sound input device, for example, a microphone and/or a sound output device, for example, a loudspeaker. Accordingly, imaging device may receive audio signals, e.g., voice signals generated by user 111, which may be recorded and stored, e.g., in storage device 123 and reproduce the audio signals through the sound output device. The sound output device may be able to reproduce any other kind of audio signals such as, radio programs, compact disc records and the like.

According to some demonstrative embodiments of the invention, controller 121 may, for example, set the mode of operation of mirror-display device 140 according to the command received from user 111. For example, if mirror-display device 140 operates in the mirror mode, the user of system 100 may provide input device with a switching command, e.g., by pressing a designated button at input device 124, for switching mirror-display device 140 to the display mode. Controller 121 may receive the input from input device 124 and may control device 140 to switch to the display mode of operation, e.g., using signals 141.

According to some demonstrative embodiments of the invention, imaging device 130 may be mounted in various positions such as, for example, on top, below, or on the side of mirror-display device 140, thereby capturing an image of a user-appearance which may be an image of a given trial of apparel, an image of user 111 with various articles, e.g., furniture and/or posing with different garments and the like. In some embodiments of the invention, imaging device 130 may capture a user-appearance as it appears in mirror-display device 140, i.e., a mirror-image of the user-appearance. In other embodiments, imaging device 130 may capture the appearance, and controller 121 may generate a mirror-image corresponding to the appearance captured by imaging device 130. For example, storage 123 may store instructions that when executed by controller may result in any suitable method or algorithm of rotating, reversing, and/or mirroring the appearance captured by imaging device 130, thereby to generate image data representing rotated, reversed, and/or mirrored image of the image captured by device 130. According to these embodiments, controller 121 may control mirror-display device 140 to display, during the display mode of operation, the rotated, reversed, and/or mirrored image. In other embodiments, controller 121 may control mirror-display device 140 to display, during the display mode of operation, an image corresponding to the image captured by device 130, e.g., a non-mirrored, non-rotated, and/or non-reversed image. In some embodiments, imaging device 130 may not be visible to user 111, may be located behind display device 140, and/or may be embedded in mirror-display device 140, which may be or may include, for example, a LCD-CCD device capable of both displaying and capturing images. For example, in one demonstrative embodiment of the invention, device 140 may include an array, screen or surface, e.g., including liquid crystals, to perform the mirror-display functionality, e.g., as described above, as well as the imaging functionality of imaging device 130, e.g., device 140 may include a mirror-imaging-display device.

In some demonstrative embodiments of the invention, one or more of stations 110, 160 and/or 170 may not include image capturing device 130; and/or one or more of stations 110, 160 and/or 170 may not include mirror-display 140. For example, a first station of system 100 may include only imaging device 130, and may not include, e.g., mirror-display device 140. User 111 may use the first station to capture the image of the first trial of the user-appearance, e.g., without being able to view at the first station the resultant image of the first trial. User 111 may later view the captured image of the first trial at another station of system 100, which may include mirror-display device 140.

According to some demonstrative embodiments of the invention, imaging device 130 may be positioned in a manner enabling capturing of an image and/or a sequence of images, videos or the like, of a scene taking place in front of mirror-display device 140. Additionally or alternatively, imaging device 130 may positioned in a manner enabling capturing an image reflected from mirror-display device 140. For example, imaging device 130 may be able to capture an image of user 111 posing in front of mirror-display device 140. While posing in front of mirror-display device 140, user 111 may check his appearance of, e.g., a first fitting trial of clothes. According to an input provided by user 111 at input device 124, imaging device 130 may capture the image of the user-appearance which may be, for example, a given trial of apparel, e.g., a garment and the like. It may be noted that trials by user 111 may also include user 111 engaging with various subjects, which may be located in the vicinity of user 111 such as, furniture, studio set-up and the like. Accordingly, imaging device 130 may capture images of user-appearances of, for example, a first trial, a second trial, etc., and may send the respective captured images to storage device 123 via signals 131 and signals 30. User 111 may be able to retrieve the captured image of, e.g., the first trial, at a later time, e.g., following the second or other subsequent trials, and may compare between the first and second or other trial, e.g., as described below with reference to FIGS. 2A, 2B and 2C.

According to some demonstrative embodiments of the invention, storage device 123 may be adapted to receive data representing images captured by imaging device 130, and to store images of appearances and, more specifically, user-appearances of, for example, given trials of apparel, captured by imaging device 130. Images of given trials of user-appearances may be retrieved from storage device 123, e.g., by controller 121, and displayed by display 140. User 111 may compare between the displayed images, e.g., as described in detail below.

According to some demonstrative embodiments of the invention, storage device 123 may include data representing, e.g., software algorithms, requiring and/or verifying user identifying data such as user-ID, password, login-time, biometric data and the like to enable secure access to station 110, as described in detail below. For example, controller 121 may control mirror-display device 140 to display images corresponding to an identity of user 111, e.g., based on the identity data provided by user 111. For example, user 111 may provide input 124 with user-identifying input, which may include, for example, a biometric input such as face recognition, a hand print, a finger print, an eye print, voice recognition and the like. The user-identifying input may include any other suitable input, for example, a credit card, a personal identification number (PIN), a password, a smart card, a customer card, a club card, or the like. Controller 121 check, e.g., based on any suitable method and/or algorithm, whether the user-identifying input provided at input device 124 matches with user-identifying data which may be stored, e.g., in storage device 123 or in control center 190. Software having the capability of verifying a biometric input may be, for example, "Active ID FaceVision technology"® provided by Geometric Inc. If controller 121 matches the input of user 111 with the stored user-identifying data, controller 121 may enable user 111 to access data representing, for example, images of previous user-appearances of user 111.

According to some demonstrative embodiments of the invention, storage device 123 may include data representing, e.g., software algorithms enabling additional system features such as, for example, rendering virtual effects on mirror-display device 140. For example, controller 121 may be able to render an image at mirror-display device 140 of user-appearances engaged and/or combined with virtual articles such as, for example, clothes, collections, headdresses, hair cuts, furniture and the like. In addition, controller 121 may be able to render an image at mirror-display device 140 of user-appearances having different body shapes for simulating, e.g., weight loss, weight gain of user 111 and the like. For example, user 111 may choose in a first trial a specific article, such as a suit out of a collection and controller 121 may virtually adjust the collection to an image of user 111 appearing in mirror-display device 140. Controller 121 may store the image of the first trial in storage device 123 and may perform the same step at a second trial. Accordingly, user 111 of system 100 may be able to compare between user-appearances of the first and a second trials of the collection.

According to some demonstrative embodiments of the invention, controller 121 may provide, for example, image and/or video browsing capabilities, image and/or video replay functions, which capabilities and functions may be predefined by system 100 or may be defined, e.g., on-the-fly, according to one or more user commands received from user 111 via input device 124. For example, controller 121 may be able to retrieve one or more images of previous user-appearances and display the images on mirror-display device 140 at various sequences. For example, images from previous trials may be displayed in a substantially continuous forward, backwards, or mixed, e.g., randomly-accessible, sequence, and/or may be a stepwise sequence or in any other sequence. Furthermore, images from previous trials may be displayed simultaneously at mirror-display device 140, e.g., as described below. Controller 121 may also be able to delete previously captured user-appearances, limit the amount of data which may be saved in storage device 123 and the like, and may further control a shape, size, color, etc., of the image displayed on mirror-display device 140.

According to some demonstrative embodiments of the invention, user 111 may use a portable storage device 180 able to store one or more of the captured images. The portable storage device may include any suitable portable storage device, e.g., a smartcard, a disk-on-key device, and the like. User 111 may download, for example, images represented by, e.g., signals 50, of a first trial of user-appearances from storage device 123, e.g., via a storage interface 125 or via any other suitable data connection. User 111 may then upload at a later time the image of, e.g., the first trial, to another location, e.g., a home of user 111, or another station of system 100, e.g., station 170.

In some embodiments of the invention, station 110 may include more than one mirror-display device or may include a mirror-display device 140, which may be partitioned simultaneously into two frames as described hereinafter with reference to FIGS. 2A and 2B.

According to some demonstrative embodiments of the invention, controller 121 may record or store, e.g., in storage 123, parameters characterizing user 111. For example, system 100 may include a weighing machine, connected to, e.g., storage device 123 via controller 121. Controller 121 may be able to record, for example, a weight of user 111 during, for example, a trial of an article. Accordingly, user 111 may later retrieve the parameter which may be, for example, the weight of user 111.

Figure 2A:
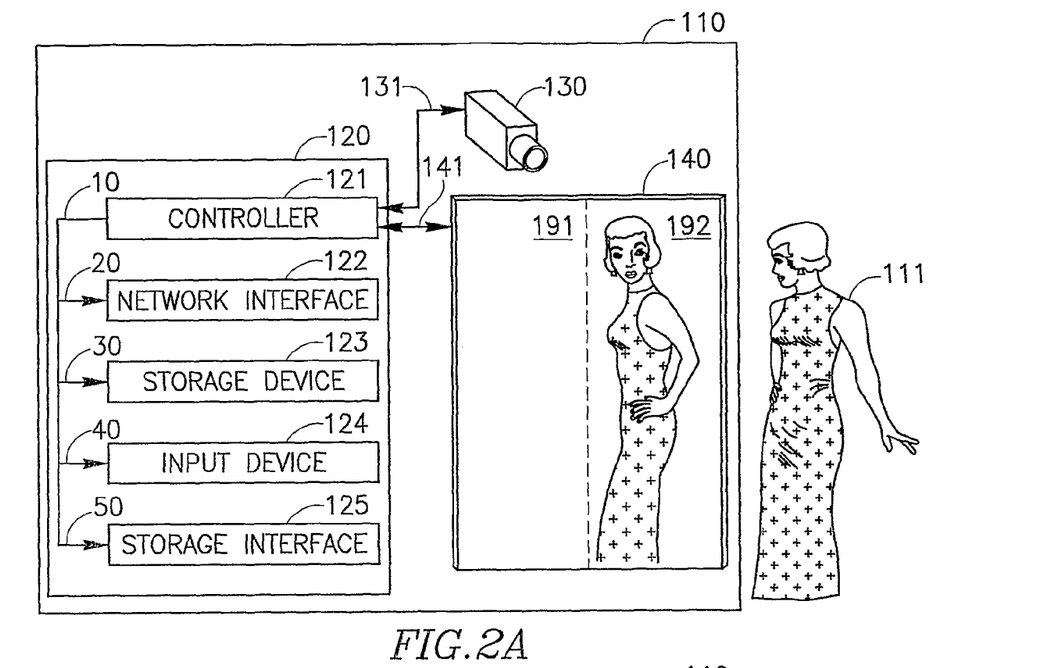
FIGS. 2A and 2B are schematic illustrations of two, sequential, stages of appearances comparison using an interactive system in accordance with some demonstrative embodiments of the invention.
Figure 2B:
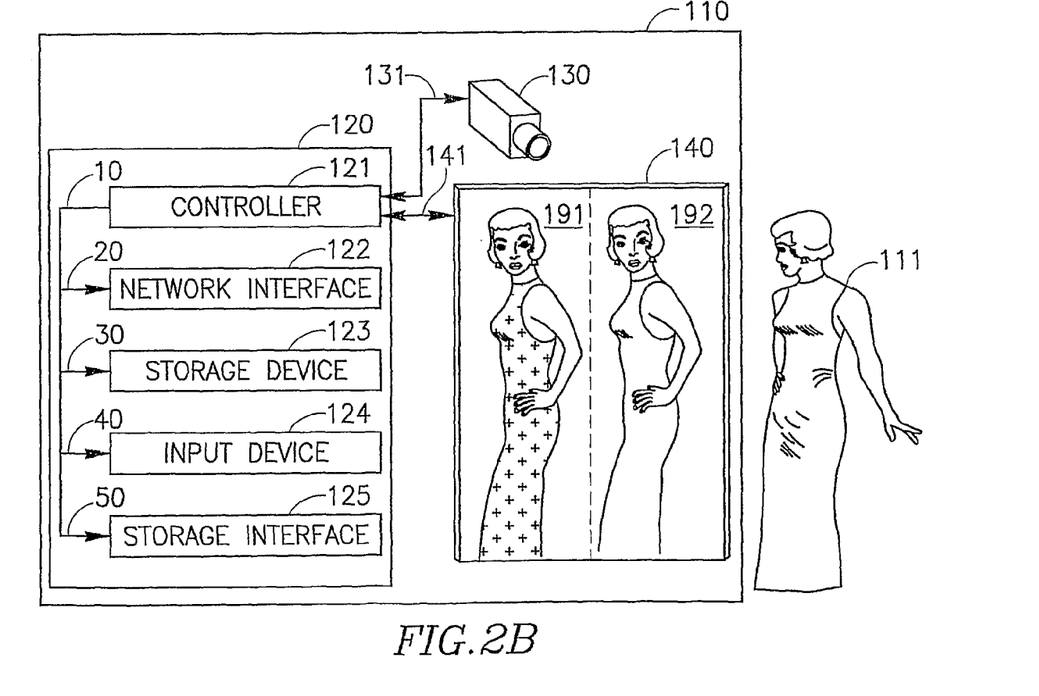

Reference is now made to FIGS. 2A and 2B, which schematically illustrate stages of comparing between appearances using an interactive system in accordance some demonstrative embodiments of the invention.

According to some demonstrative embodiments of the invention, mirror-display device 140 may be partitioned into two frames, wherein one frame may operate as a mirror frame 192 and another frame 191 may operate selectably as a mirror and as a display frame. As shown in FIG. 2A, user 111 may pose in front of mirror frame 192 a first trial, which may be captured by imaging device 130 and stored in storage device 123. Henceforward, as indicated in FIG. 2B, user 111 may view simultaneously in frame 191 the image of the user-appearance of the first trial and/or any other user-appearances, e.g., user-appearances stored in storage device 123 and/or received over network 150 (FIG. 1), side-by-side with the normal mirror appearance of a second trial in frame 192, and compare between the first and the second trial.

Figure 3A:
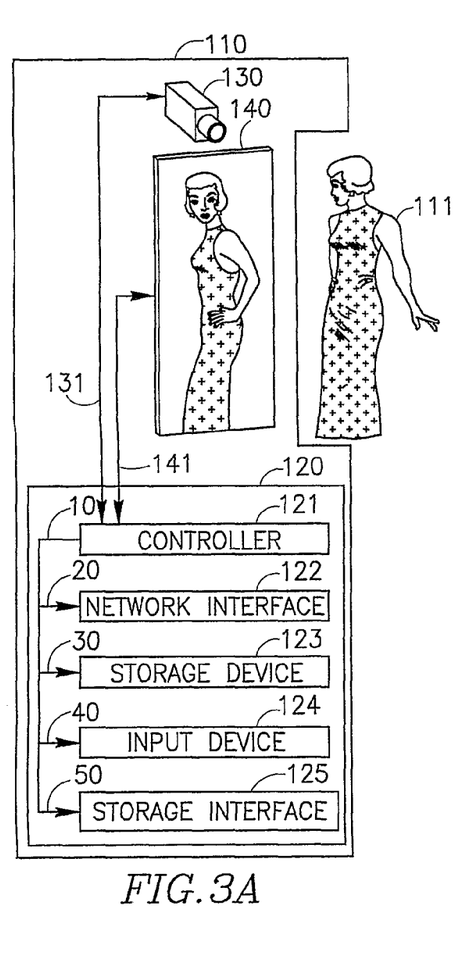
FIGS. 3A, 3B and 3C are schematic illustrations of three, sequential, stages of appearances comparison using an interactive system in accordance with some demonstrative embodiments of the invention.
Figure 3B:
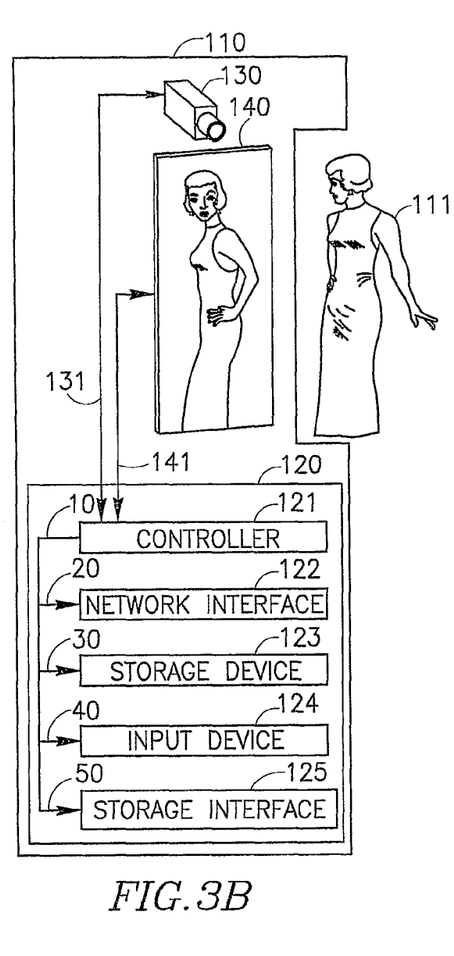
Figure 3C:
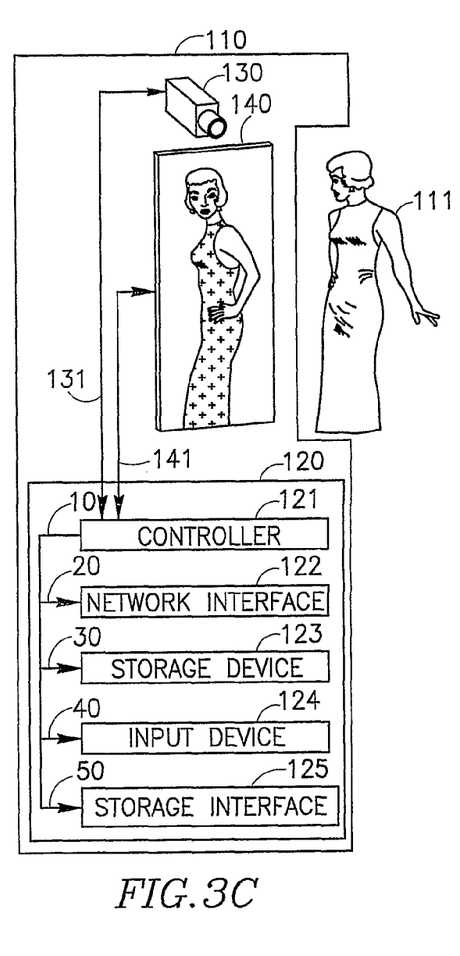

Reference is now made to FIGS. 3A, 3B and 3C, which schematically illustrate three, sequential, stages of comparing between appearances using an interactive system in accordance some demonstrative embodiments of the invention.

As shown in FIG. 3A, the user of system 100 may view a first trial of a user-appearance in mirror-display device 140 operating in its mirror mode. Controller 121 may receive, e.g., from input device 124, a user input, which may include a request to use imaging device 130 for capturing a first trial of the user-appearance. As a result, imaging device 130 may capture an image of the first trial of the user-appearance and storage device 123 may store the captured image.

As shown in FIG. 3B, user 111 may view a second trial of his user-appearance in mirror-display device 140, which may operate in the mirror mode of operation. Then, when user 111 desires to view a previous appearance, e.g., for comparison, controller 121 may receive a user input via input device 124 requesting to view the first trial. At this point, as shown in FIG. 3C, controller 121 may change the operational mode of mirror-display device 140 to the display mode using signals 141. Controller 121 may also control device 140 to display the first trial. Therefore, by switching between operating modes of mirror-display device 140, user 111 may compare the user-appearance of the second trial with the user-appearance of the first trial and/or any other user-appearances previously stored in storage device 123.

Figure 4:
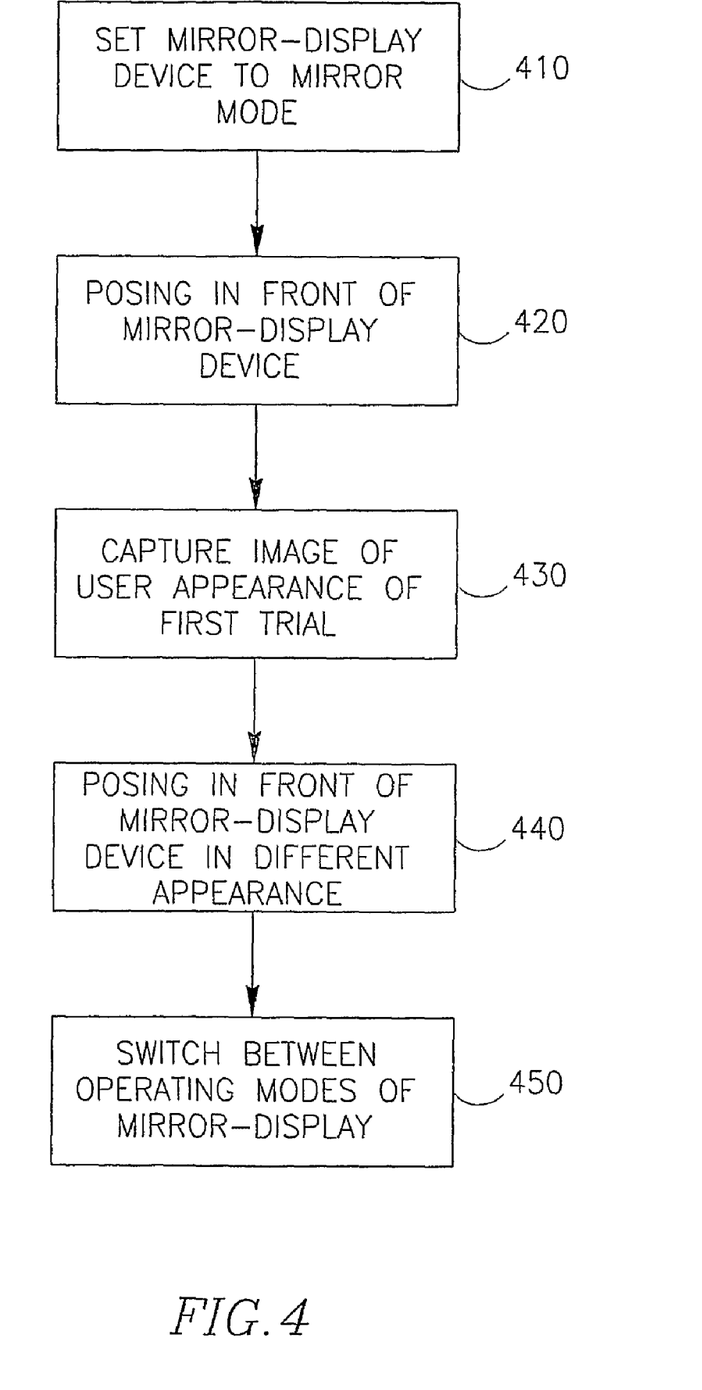
FIG. 4 is a schematic flow chart of a method enabling comparison of one or more user-appearances in accordance with some demonstrative embodiments of the invention.

Reference is now made to FIG. 4, which schematically illustrates a flow-chart of a method enabling comparing between one or more various appearances in accordance with some demonstrative embodiments of the invention. Although the invention is not limited in this respect, one or more operations of the method of FIG. 4 may be performed by one or more elements of system 100 (FIG. 1).

As indicated at block 410, the method may include, for example, setting the operating mode of a mirror-display device. For example, user 111 (FIG. 1) may initially set the operating mode of mirror-display device 140 (FIG. 1) to the mirror mode. Alternatively, display 140 (FIG. 1) may be designed to operate in the mirror mode by default whenever a new user logs into system 100 (FIG. 1).

As indicated at block 420, the method may also include, for example, posing in front of the mirror-display device. For example, user 111 (FIG. 1) may pose in front of mirror-display device 140 (FIG. 1) and check the user-appearance of a first trial of, e.g., clothing, shoes and/or any other apparel.

As indicated at block 430, the method may also include, for example, capturing an image of the user-appearance of the first trial. For example, user 111 (FIG. 1) may provide user command to device 120 (FIG. 1) commanding imaging device 130 (FIG. 1) to capture an image of the user-appearance of the first trial.

As indicated at block 440, the method may also include, for example, posing in front of the mirror-display device in a different user-appearance. For example, user 111 (FIG. 1) may change one or more items of environment such as, for example, furniture and/or apparel, pose once again in front of mirror-display device 140 which may operate in mirror mode, and view a second user-appearance.

As indicated at block 450, the method may also include, for example, switching between operating modes of the mirror-display device. For example, user 111 (FIG. 1) may switch mirror-display device 140 (FIG. 1) between the mirror and the display mode. Accordingly, user 111 (FIG. 1) may be able to compare between the user-appearance of the first trial, and/or any other user-appearances, e.g., user-appearances stored in storage device 123 and/or received over network 150 (FIG. 1), and the user-appearance of the second trial.

According to some demonstrative embodiments of the invention, user 111 (FIG. 1) may indicate, and/or station 110 (FIG. 1) may be able to store, e.g., automatically, for each trial parameters, e.g., including shopping parameters, such as, for example, name of store, address of store, price, time and/or date of trial of apparel, name of salesperson, and the like. User 111 (FIG. 1) may, for example, store the captured images of user-appearances in a removable or portable storage device, e.g., as described above with reference to FIG. 1, and may later review images of user-appearances while being able to ascribe every image to, e.g., a specific store and the like. In addition, user 111 may define, and/or controller 121 (FIG. 1) may be able to generate, and/or store in storage device 123 reminders, for example, alarms about, e.g., discounts, end of season sales and the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A system to enable appearance comparison, the system comprising:
   at least one interactive imaging and display station capable of switching between at least a mirror mode of operation and a display mode of operation, the station comprising:
   a mirror-display device to provide a mirror image from a field-of-view in front of said mirror display device, when the station is in the mirror mode, and operable as a display, when the station is in the display mode;
   an image-capturing device to capture at least one image corresponding to an appearance from the field-of-view in front of said mirror-display device; and
   a controller to selectably switch the mode of operation of said station between said mirror mode and said display mode according to a user command, and to cause the mirror-display device to display said image when the station is in said display mode.

2. The system of claim 1, wherein said controller is to cause the image-capturing device to capture said image when the station is in the mirror-mode.

3. The system of claim 1, wherein said station includes a storage device to store one or more images, and wherein the controller is to retrieve at least one of said images and control the mirror-display device to display the retrieved image.

4. The system of claim 1, wherein said station is capable of operating in a partitioned mode, in which the controller is to partition the mirror-display device into at least first and second simultaneously-displayable frames, the first frame being operable as a display and the second frame being operable as a mirror.

5. The system of claim 4, wherein said controller is to control the mirror-display device to display the image within the first frame.

6. The system of claim 1, wherein said station comprises a portable device.

7. The system of claim 1, wherein said controller is to enable a user to selectively access images of appearances authorized to said user, based on user-identifying input received from said user.

8. The system of claim 1, wherein said at least one interactive imaging and display station comprises two or more interactive imaging and display stations able to communicate over a network.

9. The system of claim 8 including a central controller to store images of appearances captured by the two or more stations and to provide one or more of the stored images to be displayed by one or more of the stations.

10. The system of claim 9, wherein said two or more stations include at least first and second stations located at first and second locations, respectively, and wherein the central controller is to receive from the first station a first image of a first appearance of a user captured at the first location and to provide the first image to be displayed by the second station, when the user is at the second location.

11. The system of claim 1, wherein the image comprises a mirrored image of the appearance.

12. A method to enable appearance comparison, the method comprising:
   using a mirror mode of a mirror-display device having at least a mirror mode and a display mode;
   capturing an image corresponding to an appearance from a field-of-view in front of said mirror-display device;
   storing said image;
   retrieving said image; and
   operating the mirror-display device to display the image.

13. The method of claim 12, wherein capturing the image includes capturing the image when the mirror-display device is in the mirror mode.

14. The method of claim 12 including partitioning the mirror-display device into at least first and second simultaneously-displayable frames, the first frame being operable as a display and the second frame being operable as a mirror.

15. The method of claim 14 comprising operating the mirror-display device to display the image within the first frame.

16. A system to enable appearance comparison, the system comprising:
   at least one interactive imaging and display station, the station comprising:
      a mirror-display device operable in at least a partitioned mode, in which the mirror-display device is partitioned into at least first and second, simultaneously-displayable frames, the first frame being operable as a display and the second frame being operable to provide a mirror image from a field-of-view in front of said mirror-display device;
      an image-capturing device to capture at least one image corresponding to an appearance from the field-of-view in front of said mirror-display device; and
      a controller to cause the mirror-display device to display said image in said first frame.

17. The system of claim 16, wherein said at least one interactive imaging and display station comprises two or more interactive imaging and display stations able to communicate over a network.

18. The system of claim 17 including a central controller to store images of appearances captured by the two or more stations and to provide one or more of the stored images to be displayed by one or more of the stations.

* * * * *